(12) United States Patent
Rosi et al.

(10) Patent No.: US 7,512,476 B2
(45) Date of Patent: Mar. 31, 2009

(54) MONITORING SYSTEM OF GAS TURBINE COMPONENTS

(75) Inventors: Leonardo Rosi, Perugia (IT); Gianni Mochi, Florence (IT); Francesco Grillo, Montespertoli Florence (IT)

(73) Assignee: Nuova Picone Holding SpA, Florence (IT)

( * ) Notice: Subject to any disclaimer, the term of this patent is extended or adjusted under 35 U.S.C. 154(b) by 664 days.

(21) Appl. No.: 10/924,262

(22) Filed: Aug. 24, 2004

(65) Prior Publication Data
US 2005/0080548 A1    Apr. 14, 2005

(30) Foreign Application Priority Data
Aug. 26, 2003    (IT)    ............................ MI2003A1669

(51) Int. Cl.
*G06F 7/00*    (2006.01)
(52) U.S. Cl. ........................................ 701/100; 700/287
(58) Field of Classification Search ................ 701/100, 701/107, 29, 115; 702/33–36, 105, 113–115, 702/122, 182–185, 187–188; 700/287–290, 700/32–34
See application file for complete search history.

(56) References Cited

U.S. PATENT DOCUMENTS

| | | | |
|---|---|---|---|
| 5,951,611 A * | 9/1999 | La Pierre | ...................... 701/29 |
| 6,243,628 B1 * | 6/2001 | Bliley et al. | ..................... 701/29 |
| 6,757,668 B1 * | 6/2004 | Goebel et al. | .................. 706/59 |
| 7,050,943 B2 * | 5/2006 | Kauffman et al. | ........... 702/188 |
| 7,149,632 B1 * | 12/2006 | Gao et al. | ...................... 702/34 |

* cited by examiner

*Primary Examiner*—Dalena Tran
(74) *Attorney, Agent, or Firm*—Nixon & Vanderhye, P.C.

(57) ABSTRACT

A monitoring system of components of a gas turbine (1) comprising:
a acquisition device (3) of signals proportional to functioning parameters characteristic of the functioning state of a gas turbine (1),
a first electronic processing unit (4) comprising a first data base,
a second electronic processing unit (6),
a data transfer device, capable of electronically conveying the contents of said first data base to a second electronic processing unit (6),
a monitoring program associated with said second electronic processing unit (6) comprising a library of algorithms, which allow the performances of the gas turbine (1) and its components to be determined by comparing data coming from subsequent recordings of said functioning parameters,
a display device associated with said second electronic processing unit (6) whereby it is possible to gain access to the functionality of said monitoring program by means of a graphic interface.

4 Claims, 1 Drawing Sheet

MONITORING SYSTEM OF GAS TURBINE COMPONENTS

The present invention relates to a monitoring system of gas turbine components, in particular to evaluate the deterioration of the performances of the components, such as, for example, an axial compressor and a turbine 5.

Gas turbines are machines consisting of a compressor and a turbine with one or more phases, wherein said components are connected to each other by a rotating shaft 11 and wherein, between the compressor 10 and the gas turbine, there is a combustion chamber 12.

Air is fed to the compressor, which is sucked from the outside environment by means of a filter 13 to bring it under pressure.

The development of control systems has enabled these machines to become more efficient, as far as is possible, by producing systems which are capable of determining and monitoring the performance of said machines and eventually control its functionally.

An estimate of the performances is normally effected by comparing the performances registered with theoretical performances.

This estimate can be easily implemented for turbines functioning with a constant charge in which the theoretical performance can be easily determined.

A disadvantage of current monitoring systems is that, in the case of frequent regulations, for example of the number of revs of the turbine 5 and compressor 10, it is difficult to determine the theoretical performance values for each possible functioning condition.

In particular turbine applications, such as those, for example, known as "Mechanical Drive", in which extra-project functioning conditions are prevalent and in which gas turbine regulations are frequent, it is extremely difficult to determine the theoretical performance values and consequently also a reliable estimate of the deterioration in the performance of the components.

For the purposes of the present invention, extra-project conditions refer to functioning conditions in which it is not possible to calculate a priori the theoretical performances of the gas turbine 1 as it is made up of elements, such as the compressor and turbine, which interact with each other, and it is therefore not possible to determine the overall yield of the gas turbine and consequent performances, without carrying out a detailed thermodynamic analysis.

An objective of the present invention is to provide a simple and economical monitoring system of gas turbine components.

Another objective is to provide a monitoring system of gas turbine Components which can effect a reliable estimate of the deterioration in the performance of gas turbine components subject to extra-project functioning conditions and to frequent regulations.

These objectives according to the present invention are achieved by providing a monitoring system of the components of a gas turbine which can be effected through the performance trend with time, obtained by acquiring the functioning parameters over a period of time and comparing the performances having the same parameters or similar functioning parameters.

An aspect of the present invention relates to a monitoring system of the Components of a gas turbine 1 comprising:

an acquisition device 3 of signals proportional to functioning parameters characteristic of the functioning state of a gas turbine 1, a first electronic processing unit 4 comprising a first data base, a second electronic processing unit 6, a data transfer device, capable of electronically conveying the contents of said first data base to a second electronic processing unit 6, a monitoring program associated with said second electronic processing unit 6, comprising a library of algorithms, which allow the performances of the gas turbine 1 and its components to be determined, by comparing data coming from subsequent recordings of said functioning parameters, a display device associated with said second electronic processing unit 6 whereby it is possible to gain access to the functionality of said monitoring program by means of a graphic interface.

Further characteristics of the invention are described in the subsequent claims.

The characteristics and advantages of a monitoring system of the components of a gas turbine according to the present invention will appear more evident from the following illustrative and non-limiting description, referring to the enclosed schematic drawings, in which.

With reference to the figures, these illustrate a monitoring system of the components of a gas turbine 1 which allows the performance trend of the components of a gas turbine 1, in particular of the axial compressor 10 and turbine 5 connected thereto, to be controlled.

The monitoring system according to the present invention overcomes the problem of calculating the theoretical performances by comparing the performance data of the gas turbine 1, periodically registered over a period of time.

It does in fact allow diagnostic trends to be determined, which reveal the deterioration of the components of a gas turbine 1, with the consequent possibility of predicting maintenance or substitution operations of the worn parts and optionally control operations of the functioning of the turbine itself.

This allows a greater degree of safety, as it avoids sudden interruptions in the functioning due to unexpected malfunctioning and allows precautionary verifications and controls to be programmed.

Figure 1:
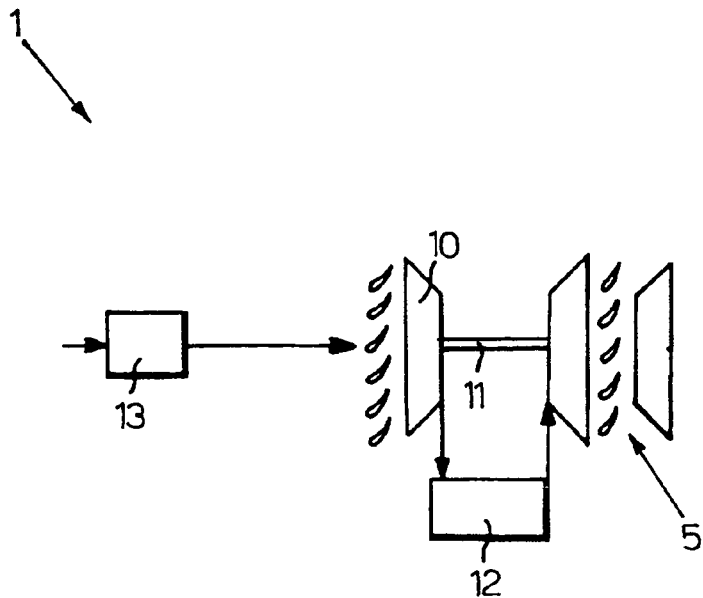
FIG. 1 is a schematic view of a gas turbine.
Figure 2:
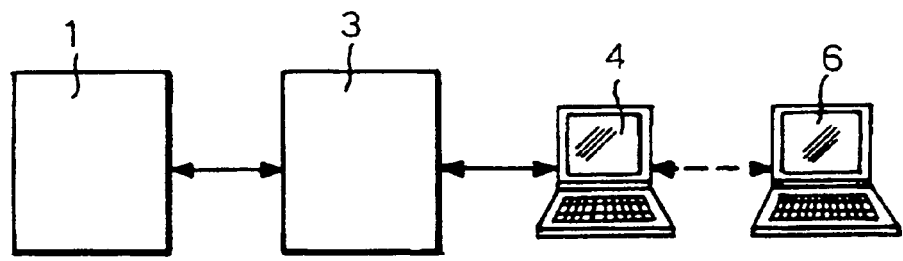
FIG. 2 is a schematic view of a monitoring system according to the present invention.

With reference to FIG. 2, the monitoring system therefore comprises an acquisition device 3 of signals, proportional to the functioning parameters characteristic of the functioning state of the gas turbine 1, such as, for example, the power developed, the velocity, the compression ratio of the compressor, the number of revs of the compressor, the expansion ratio of the turbine 5, and the number of revs of the turbine 5.

The system comprises a first electronic processing unit 4, capable of memorizing data relating to said signals in a first data base, and also comprises a data transfer device capable of electronically conveying the contents of the first data base to a second electronic processing unit 6 preferably by means of modems, satellite networks, Internet webs and equivalent systems.

Said second electronic processing unit 6 memorizes the contents of the first data base in a second data base.

It also effects a data classification according to a similarity criterion, in particular, the data are classified on the basis of similar functioning states, in order to reveal diagnostic trends which indicate the deterioration of the components of the gas turbine 1.

An alpha-numerical string is associated, by the second electronic processing unit 6, with each acquisition identified by the time instant and relative machine number, which allows the operative functioning state of the gas turbine 1 and its components to be identified.

The alpha-numerical string enables the functioning data of the gas turbine 1 to be classified on the basis of the stability of the machine, associated with the parameter variations such as, for example, the power developed, and on the basis of the adimensional parameter values, which identify the functioning point of the components on the relative characteristic functioning curves.

The alpha-numerical string is defined as follows:

M m Z1Z2 Z3Z4

It contains the identification code of the state of the machine, which can be divided into three main blocks each of which has a classification of information.

A first block comprises the macrostate "M" which identifies the operative state of the machine.

This parameter firstly allows the stationary functioning states to be divided from the functioning states in which the characteristic machine signals vary, as happens, for example, during a regulation or during the start-up or shut-down transient of the machine or for an emergency stoppage.

The first block also comprises the microstate "m" which, in the case of stationary functioning states, identifies a series of correct thermal charge ranges.

In the case of non-stationary states, on the other hand, the microstate "m" allows a more detailed identification of the transient.

A second block comprises the "Z1" and "Z2" parameters which enable the data acquired to be classified on the basis of the compressor functioning.

The "Z1" and "Z2" parameters identify a range of values of the compression ratio and number of correct compressor revs, respectively.

A third block comprises the "Z3" and "Z4" parameters which enable the data acquired to be classified on the basis of the gas turbine 1.

The "Z1" and "Z2" parameters identify a range of values of the expansion ratio and number of correct revs of the turbine 5, respectively.

The monitoring system of the present invention comprises a monitoring system which includes a library of algorithms which allow the performances of the gas turbine 1 and its components to be determined.

The monitoring system also comprises a display device associated with said second electronic processing unit 6 whereby it is possible to gain access to the functionality of said monitoring program by means of a graphic interface.

It also allows the performance trend to be determined, using data classified as similar, previously acquired and memorized in the second electronic processing unit 6, and consequently the deterioration of the components themselves.

In order to reveal the deterioration of the axial compressor, for example, the monitoring program uses all the data previously acquired relating to the stationary functioning of the compressor, and wherein the compressor develops a certain compression ratio and runs at a certain number of correct revs.

In this way, similar acquired data are compared, i.e. identified by the same operative functioning state, in which the yield remains approximately constant or varies due to the deterioration of the components.

Furthermore, when critical performance values are reached, the monitoring system indicates an anomaly condition of the functioning of the gas turbine 1 by emitting an alarm signal.

Said signal acquisition device 3, moreover, also comprises at least one sensor capable of indicating at least one signal proportional to a functioning parameter characteristic of the functioning state of the gas turbine 1.

A further aspect of the present invention relates to a method for monitoring and estimating the deterioration of the components of a gas turbine 1 which comprises the following phases:

indicating a series of signals corresponding to parameters relating to the functioning state of the gas turbine 1 and its components, memorizing said series of signals in a first data base by means of a first electronic processing unit 4, sending the signals to a second electronic processing unit 6 and memorizing them in a second data base, associating an alpha-numerical string with the data contained in the second data base, which classifies said data on the basis of a similarity criterion, determining the performance trend by comparing the data of subsequent recordings having the same classification, regulating the functioning parameters of the gas turbine 1 on the basis of the trend of performances obtained.

The invention claimed is:

1. A monitoring system of the components of a gas turbine capable of determining performance trends over time comprising:

an acquisition device configured to acquire signals proportional to functioning parameters characteristic of a functioning state of components of a gas turbine, a first electronic processing unit capable of memorizing said signals in a first database, a second electronic processing unit capable of memorizing contents of said first data base in a second data base, a data transfer device, capable of electronically conveying contents of said first database to said second electronic processing unit, a monitoring program associated with said second electronic processing unit comprising a library of algorithms configured to classify the contents of the second electronic processing unit in accordance with said functioning parameters based on similarity criteria, and, to enable performance of the gas turbine and its components to be determined with respect to any one or more of said functioning parameters by comparing said contents of said second electronic processing unit with similarly classified data coming from subsequent recordings of said functioning parameters, a display device associated with said second electronic processing unit, said display device being configured to gain access to the functionality of said monitoring program by means of a graphic interface.

2. The monitoring system of the components of a gas turbine according to claim 1, wherein said signal acquisition device comprises at least one sensor capable of detecting at least one signal proportional to a functioning parameter characteristic of the functioning state of the gas turbine.

3. The monitoring system of the components of a gas turbine according to claim 1, wherein said data transfer device is capable of electronically sending the contents of said first database by means of modems, satellite networks, Internet webs or equivalent systems.

4. A method for monitoring and estimating the deterioration of the components of a gas turbine which comprises the following phases:
- indicating a series of signals corresponding to parameters relating to the functioning state of the gas turbine and its components,
- memorizing said series of signals in a first database by means of a first electronic processing unit,
- sending the signals to a second electronic processing unit and memorizing them in a second database,
- associating an alpha-numerical string with data contained in the second database, which classifies said data on the basis of a similarity criterion,
- determining the performance trend by comparing said data with data of subsequent recordings having the same alpha-numerical string,
- regulating the functioning parameters of the gas turbine on the basis of the trend of performances obtained.

* * * * *